United States Patent
Aycock et al.

(10) Patent No.: US 9,416,949 B2
(45) Date of Patent: Aug. 16, 2016

(54) ADJUSTABLE BRACKET ASSEMBLY FOR AN ULTRAVIOLET LAMP

(71) Applicant: FIELD CONTROLS, LLC, Kinston, NC (US)

(72) Inventors: James L. Aycock, Kinston, NC (US); Patrick T. Holleran, Kinston, NC (US)

(73) Assignee: FIELD CONTROLS, LLC, Kinston, NC (US)

( * ) Notice: Subject to any disclaimer, the term of this patent is extended or adjusted under 35 U.S.C. 154(b) by 192 days.

(21) Appl. No.: 13/962,453

(22) Filed: Aug. 8, 2013

(65) Prior Publication Data

US 2014/0208574 A1    Jul. 31, 2014

Related U.S. Application Data

(60) Provisional application No. 61/756,746, filed on Jan. 25, 2013.

(51) Int. Cl.
| | |
|---|---|
| F21V 21/28 | (2006.01) |
| F21V 19/02 | (2006.01) |
| F16M 11/06 | (2006.01) |
| F21V 21/096 | (2006.01) |
| A47B 96/06 | (2006.01) |
| F16M 11/04 | (2006.01) |
| F16M 13/00 | (2006.01) |
| F21V 21/14 | (2006.01) |

(Continued)

(52) U.S. Cl.
CPC ............... *F21V 21/14* (2013.01); *F21V 19/02* (2013.01); *F21V 21/096* (2013.01); *E04B 9/006* (2013.01); *F16M 11/04* (2013.01); *F16M 11/06* (2013.01); *F21V 21/28* (2013.01); *F21Y 2103/00* (2013.01); *F24F 2003/1667* (2013.01); *Y10T 29/49947* (2015.01)

(58) Field of Classification Search
CPC ....... F21V 21/14; F21V 19/02; F21V 21/096; F21V 21/28; F24F 2003/1667; A47B 96/06; A47B 96/061; Y10T 29/49947; Y10T 29/49948; F16M 11/04; F16M 11/06; F21Y 2103/00
USPC .............................. 29/525.01, 525.02, 525.11
See application file for complete search history.

(56) References Cited

U.S. PATENT DOCUMENTS

| | | | | |
|---|---|---|---|---|
| 494,348 | A | * | 3/1893 | Richardson .................... 248/326 |
| 1,607,807 | A | * | 11/1926 | Anderson ...................... 248/326 |

(Continued)

FOREIGN PATENT DOCUMENTS

CN            202216055          5/2012

OTHER PUBLICATIONS

Examination Report for Canadian Patent Application No. 2,823,458 dated Aug. 1, 2014, 3 pgs.

(Continued)

*Primary Examiner* — Christopher Besler
*Assistant Examiner* — Bayan Salone
(74) *Attorney, Agent, or Firm* — Brinks Gilson & Lione

(57) ABSTRACT

A system for adjusting a position of a lighting element is disclosed. The system comprises a first bracket and a second bracket, where the second bracket is coupled to a lighting element. The second bracket is movable relative to the first bracket. The first bracket may be fixed in place. The second bracket may be movable in both longitudinal and radial directions relative to the first bracket.

20 Claims, 2 Drawing Sheets

(51) Int. Cl.
*E04B 9/00* (2006.01)
*F24F 3/16* (2006.01)
*F21Y 103/00* (2016.01)

(56) References Cited

U.S. PATENT DOCUMENTS

| | | | | |
|---|---|---|---|---|
| 1,611,903 | A * | 12/1926 | Gelb | 248/590 |
| D74,864 | S * | 4/1928 | Crawford | D8/355 |
| 2,914,286 | A * | 11/1959 | Weaver | 248/265 |
| 3,917,940 | A * | 11/1975 | Duddy | 362/398 |
| 4,612,740 | A * | 9/1986 | Yamamoto | 248/225.11 |
| 4,990,313 | A * | 2/1991 | Pacosz | 96/224 |
| 5,154,509 | A * | 10/1992 | Wulfman | F21V 21/096 362/227 |
| 5,477,443 | A * | 12/1995 | Cvek | 362/413 |
| 5,523,057 | A * | 6/1996 | Mazzilli | 422/121 |
| 5,529,273 | A * | 6/1996 | Benthin | 248/254 |
| 5,730,522 | A * | 3/1998 | Wyke et al. | 362/432 |
| 5,866,076 | A * | 2/1999 | Fencl | A61L 9/20 250/454.11 |
| 5,902,552 | A * | 5/1999 | Brickley | A61L 2/10 250/455.11 |
| 6,592,241 | B1 * | 7/2003 | Kovacik et al. | 362/419 |
| 6,630,678 | B2 * | 10/2003 | Guzorek | 250/432 R |
| 6,662,499 | B1 * | 12/2003 | Shin et al. | 49/26 |
| 6,679,068 | B1 | 1/2004 | Guzorek | |
| 6,746,134 | B1 * | 6/2004 | Guzorek | 362/647 |
| 6,809,326 | B2 * | 10/2004 | Disabito et al. | 250/504 R |
| 6,809,362 | B2 * | 10/2004 | Gilton | 257/296 |
| 6,832,844 | B2 * | 12/2004 | Guzorek | 362/263 |
| 6,838,057 | B2 * | 1/2005 | Russell et al. | 422/121 |
| 7,064,342 | B2 * | 6/2006 | Guzorek | 250/504 R |
| 7,332,124 | B2 * | 2/2008 | Trifu | A61L 9/205 422/121 |
| 7,419,642 | B2 * | 9/2008 | Fowler et al. | 422/121 |
| 7,497,719 | B2 * | 3/2009 | Ciancanelli et al. | 439/356 |
| 7,549,779 | B2 * | 6/2009 | Genenbacher | 362/398 |
| 7,661,977 | B2 * | 2/2010 | Zayas et al. | 439/357 |
| 7,704,463 | B2 * | 4/2010 | Willette | A61L 9/20 422/108 |
| 8,070,121 | B2 * | 12/2011 | Dozier et al. | 248/294.1 |
| 8,398,316 | B2 * | 3/2013 | Mota et al. | 396/427 |
| 9,035,270 | B2 * | 5/2015 | Graebel | F24F 7/04 250/436 |
| 2004/0035983 | A1 * | 2/2004 | Simonson et al. | 248/49 |
| 2004/0084639 | A1 * | 5/2004 | Guzorek | 250/504 R |
| 2005/0163653 | A1 * | 7/2005 | Crawford | A61L 2/10 422/24 |
| 2013/0051025 | A1 * | 2/2013 | Lai | 362/269 |
| 2014/0252248 | A1 * | 9/2014 | Graebel | F24F 7/04 250/504 R |

OTHER PUBLICATIONS

Response to Examiner's Report for Canadian Patent Application No. 2,823,458 filed Feb. 2, 2015, 9 pgs.
Examination Report for Canadian Patent Application No. 2,823,458 dated Jun. 5, 2015, 5 pgs.

* cited by examiner

ADJUSTABLE BRACKET ASSEMBLY FOR AN ULTRAVIOLET LAMP

PRIORITY CLAIM

This invention claims the benefit of priority of U.S. Provisional Application Ser. No. 61/756,746, entitled "Adjustable Bracket Assembly For An Ultraviolet Lamp," filed Jan. 25, 2013, the disclosure of which is hereby incorporated by reference in its entirety.

BACKGROUND

The present embodiments relate generally to a system for adjusting a position of a lighting element, such as an ultraviolet lamp.

There are a wide range of environments for which it may be desirable to reduce contaminants passing through an air space. For example, the dark and damp conditions within the ducts of an HVAC system are conducive to the rapid growth and reproduction of contaminants such as molds, spores, bacteria, viruses and mildews, which may be harmful to the people for whom the air traveling therethrough is intended.

Air filters have been introduced into HVAC systems in an attempt to remove contaminants passing therethrough before they reach inhabitants. However, these filters often become damp themselves and provide conditions which foster growth and reproduction of the contaminants.

It is known that light of the "C" band of the ultraviolet spectrum, with wavelengths between approximately 220 and 288 nanometers ("UV light"), can control growth of or kill most contaminants currently known to exist within HVAC systems. The longer the period of time a unit of air is exposed to UV light, and the greater the density of the UV light that a unit of air is exposed to, the greater the number of contaminants within the unit of light will be killed thereby. Lamps capable of emitting UV light typically comprise a long, hollow cylinder containing one or more gases therein that will, upon being excited by electric current, emit UV light. These UV lamps primarily radiate UV light in a direction perpendicular to the surface from which the light emanates. Therefore, light is emitted in radial or perpendicular directions along the length of the UV light tube.

Known configurations of UV lamps in an air space, such as an HVAC system, may fail to provide a sufficient amount of UV light, or fail to be oriented in optimal directions, to control growth of or kill the desired amount of contaminants. Accordingly, it would be desirable to employ a device that can increase the effectiveness of a tubular UV lamp used to control or kill contaminants within an air space, including but not limited to an HVAC system.

SUMMARY

A system for adjusting a position of a lighting element is disclosed. The system comprises a first bracket and a second bracket, where the second bracket is coupled to a lighting element. The second bracket is movable relative to the first bracket. The first bracket may be fixed in place. The second bracket may be movable in both longitudinal and radial directions relative to the first bracket.

In one embodiment, the first bracket comprises a vertically-oriented surface and a longitudinally-oriented surface. The second bracket also may comprise a vertically-oriented surface and a longitudinally-oriented surface, where the longitudinally-oriented surface of the first bracket abuts the longitudinally-oriented surface of the second bracket.

At least one slot may be formed in the longitudinally-oriented surface of the first bracket. At least one elongate member may be coupled to the second bracket and disposed through the at least slot formed in the first bracket. A bore may be formed in the longitudinally-oriented surface of the second bracket, where the bore is aligned with the at least one slot of the first bracket, and where the at least one elongate member is disposed through the bore.

In one embodiment, a magnet is coupled the vertically-oriented surface of the first bracket. The magnet may be coupled to the vertically-oriented surface of the first bracket in a direction facing away from the second bracket.

Advantageously, the adjustable bracket assembly allows the lighting element to be positioned with a significantly greater degree of freedom than is possible with a fixed bracket design. Moreover, installation difficultly of the system may be reduced relative to prior designs.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
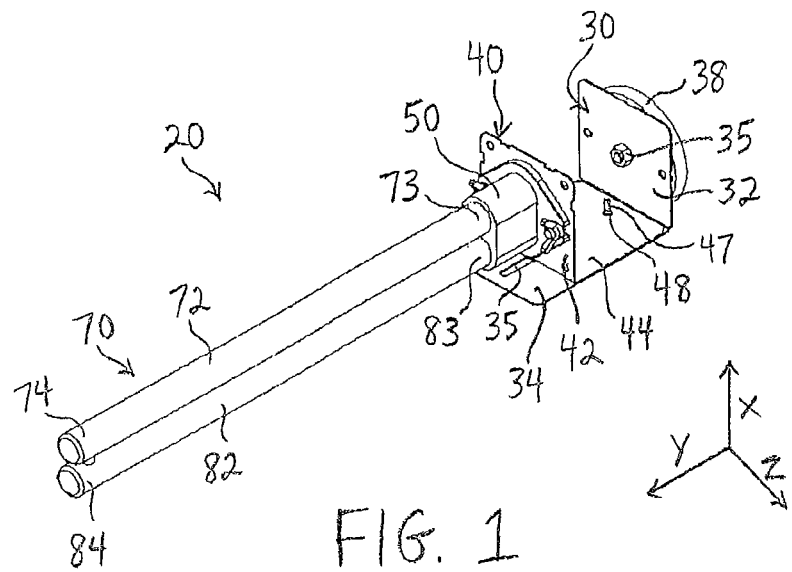
FIG. 1 is a schematic perspective view of an embodiment of an adjustable bracket assembly in a collapsed configuration.

Referring to FIG. 1, a schematic perspective view of an embodiment of an adjustable bracket assembly 20 in a collapsed configuration is shown and described. In this embodiment, the adjustable bracket assembly 20 comprises a first bracket 30 and a second bracket 40. The second bracket 40 is coupled to a lighting assembly 70. The second bracket 40 is movable relative to the first bracket 30.

In one embodiment, the first bracket 30 is fixed in place, and the second bracket 40 is the only bracket that is capable of movement, as generally shown and described herein. However, in alternative embodiments, it is contemplated that both the first and second brackets 30 and 40 may be movable independently of one another.

For illustrative purposes, vertical, longitudinal and radial directions x, y and z, respectively, are depicted in FIG. 1. In the example of FIGS. 1-4, the second bracket 40 is movable in both the longitudinal and radial directions y and z relative to the first bracket 30, as explained further below.

The first bracket 30 may comprise a vertically-oriented surface 32 and a longitudinally-oriented surface 34, as shown in FIGS. 1-4. Similarly, the second bracket 40 may comprise a vertically-oriented surface 42 and a longitudinally-oriented surface 44. The longitudinally-oriented surface 44 of the second bracket 40 may be disposed atop and abut the longitudinally-oriented surface 34 of the first bracket 00.

In the examples shown, the vertically-oriented and longitudinally-oriented surfaces 32, 34, 42 and 44 are each generally depicted as flat and square-shaped plates. However, in alternative embodiments, these surfaces 32, 34, 42 and 44 may comprise alternative shapes, including but not limited to rectangular or curved surfaces. Moreover, while the phrases "vertically-oriented" and "longitudinally-oriented" are used to refer to the surfaces 32, 34, 42 and 44 when describing the non-limiting exemplary embodiment of FIGS. 1-4, it will be appreciated that the first and second brackets 30 and 40 may comprise one surface that is not oriented precisely in the vertical direction and another surface that is not oriented precisely in the longitudinal direction. More specifically, any of the surfaces 32, 34, 42 and 44 may be oriented in combinations of one or more of the vertical, longitudinal and radial directions x, y and z.

In the example of FIGS. 1-4, at least one slot 35 is formed in the longitudinally-oriented surface 34 of the first bracket 30, and at least one securing member, such as a transverse or elongate member 47, is coupled to the second bracket 40 and disposed through the at least slot 35 formed in the first bracket 30. A bore 48 may be formed in the longitudinally-oriented surface 44 of the second bracket 40, and the bore 48 may be aligned with the at least one slot 35 of the first bracket 30. The at least one elongate member 47 is disposed through the bore 48 and through the slot 35. In one example, the elongate member 47 comprises a bolt, which may be coupled to a nut in a manner that allows longitudinal movement of the bolt within the slot 35. However, in alternative embodiments, the securing member may be any mechanical fastener that adjustably fixes the position of the second bracket 40 relative to the first bracket 30, and is not limited to the exemplary transverse or elongate member 47 depicted herein.

Figure 2:
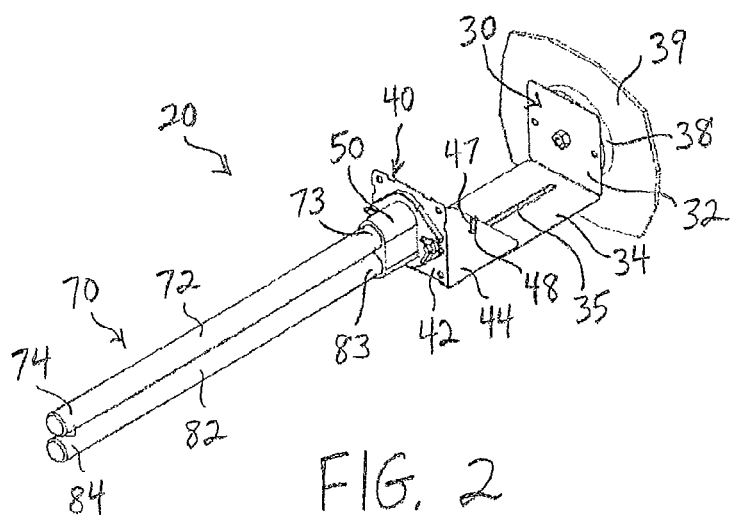
FIG. 2 is a schematic perspective view of the adjustable bracket assembly of FIG. 1 in an extended configuration.
Figure 3:
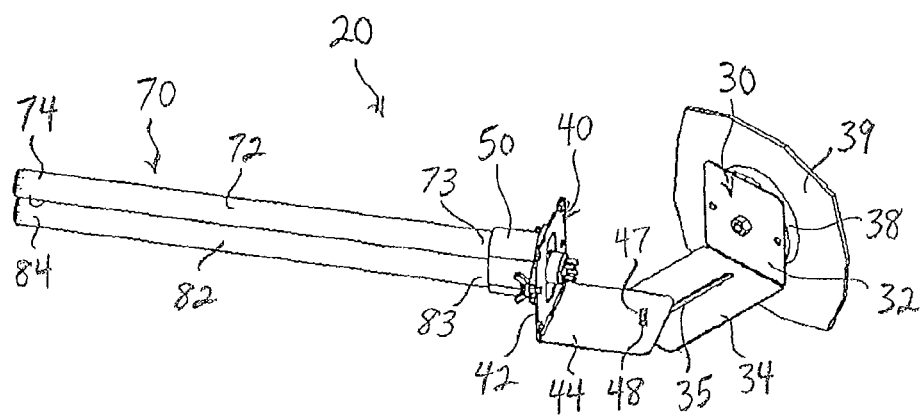
FIG. 3 is a schematic perspective view of the adjustable bracket assembly of FIG. 1 in an angled and extended configuration.
Figure 4:
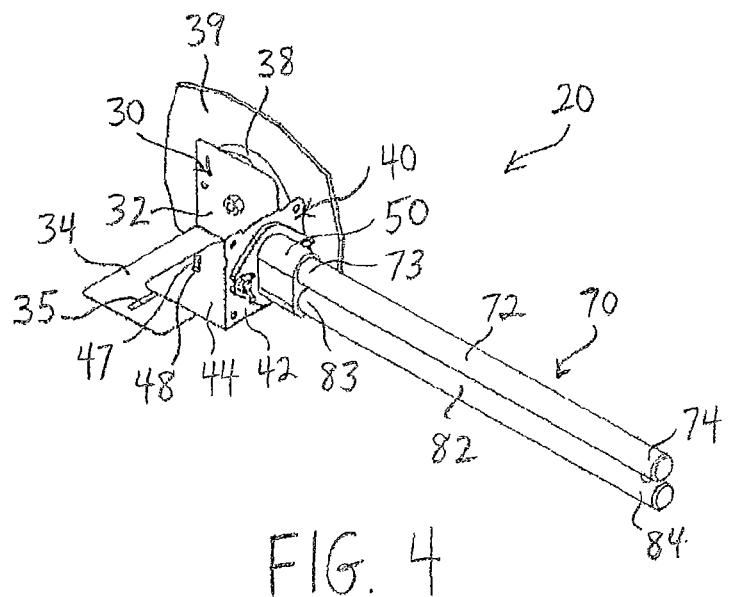
FIG. 4 is a schematic perspective view of the adjustable bracket assembly of FIG. 1 in an angled and collapsed configuration.

The vertically-oriented surface 32 of the first bracket 30 may be fixed in place when coupled to a mounting surface, such as a wall of a duct. In one embodiment, a magnet 38 is secured to the vertically-oriented surface 32 of the first bracket 30, e.g., using a bolt and nut arrangement 35. The magnet 38 may be disposed on a surface of the first bracket 30 in a direction facing away from the second bracket 30, as depicted in FIGS. 1-4. An exemplary mounting surface 39 is illustrated in FIGS. 2-4, but not FIG. 1, solely for illustrative purposes. The magnet 38 may be secured to the mounting surface 39, thereby fixing the first bracket in place relative to the mounting surface 39.

In an alternative embodiment, the first bracket 30 may be secured to the mounting surface 39 using sheet metal screws or similar attaching means. In this alternative, the vertically-oriented surface 32 of the first bracket 30 may comprise a plurality of mounting holes for attaching the first bracket 30 to the mounting surface 39. The first bracket 30 may attach to the surface such that it prevents the transmission of UV light from inside an air duct to the area surrounding the air duct. Additionally, sealing means may be used to seal the first bracket 30 to the mounting surface 39 to further prevent the transmission of UV light from inside the air duct to the area surrounding the air duct.

The lighting assembly 70 may comprise an ultraviolet light assembly, which in this non-limiting example comprises first and second lamps 72 and 82. In one example, a coupling member 50 is positioned on the vertically-oriented surface 42 of the second bracket 40. As shown in FIGS. 1-4, the first and second lamps 72 and 82 have respective first ends 73 and 83 that may be secured to the coupling member 50 of the second bracket 40, and further comprise second ends 74 and 84 that extend away from the second bracket 40. It is noted that there is a ballast to power the lamps, which may be attached by a cable and mounted at a suitable location.

The ultraviolet light assembly may comprise a 120 Volt, 30 Watt, 0.5 Amp, 60 Hz, UV lamp such as the UV lamp sold under part number 46365402 by Field Controls (Kinston, N.C.). However, as will be appreciated, any other suitable UV lamps may be used in conjunction with the adjustable bracket assembly 20. Moreover, while the present examples have described use of an ultraviolet light in conjunction with the adjustable bracket assembly 20, it will be appreciated that other lighting elements, ultraviolet and otherwise, may be used with the adjustable bracket assembly 20.

In use, the adjustable bracket assembly 20 is movable between a wide number of positions. FIG. 1 shows the adjustable bracket assembly in a fully collapsed configuration. In this state, the longitudinally-oriented surface 44 of the second bracket 40 is disposed in substantially close proximity to the vertically-oriented surface 32 of the first bracket 30. The elongate member 47 is also disposed at a far end of the slot 35, i.e., at a location substantially close to the vertically-oriented surface 32 of the first bracket 30. Accordingly, the lighting assembly 70, including the first and second lamps 72 and 82, is positioned in relatively close proximity to the mounting surface 39 and oriented in a direction that is generally parallel to the slot 35.

Referring to FIG. 2, the adjustable bracket assembly 20 is shown in an extended configuration in which the longitudinally-oriented surface 44 of the second bracket 40 is advanced in the longitudinal direction y away from the vertically-oriented surface 32 of the first bracket 30. The elongate member 47 is also disposed at a near end of the slot 35, i.e., at a location further away from the mounting surface 39, as compared to the collapsed configuration of FIG. 1. Accordingly, the lighting assembly 70, including the first and second lamps 72 and 82, is positioned further away from the mounting surface 39, but is still oriented in a direction that is generally parallel to the slot 35.

Referring to FIG. 3, the adjustable bracket assembly 20 is shown in an angled and extended configuration in which the second bracket 40 is rotated in the radial direction z with respect to the first bracket 30. It is noted that the elongate member 47 is allowed to rotate within the bore 48 and the slot 35, while being disposed at a near end of the slot 35, i.e., at a location further away from the vertically-oriented surface 32 of the first bracket 30. In the illustrative embodiment of FIG. 3, the second bracket 40 has been rotated in a clockwise direction between about 30-60 degrees relative to the orientation of FIG. 2, and therefore the orientation of the lighting assembly 70 is rotated accordingly along with the second bracket 40. However, it will be appreciated that the second bracket 40 and the lighting assembly 70 may be rotated to any degree between 0-90 degrees, or greater than 90 degrees if space constraints within the air space, such as an air duct, permit such rotational movement.

Referring to FIG. 4, the adjustable bracket assembly 20 is shown in an angled and collapsed configuration in which the second bracket 40 is rotated counterclockwise from the position of FIG. 3 in the radial direction z with respect to the first bracket 30. In the illustrative embodiment of FIG. 3, the second bracket 40 and the lighting assembly 70 have been rotated in a counterclockwise direction such that they are positioned at an angle of about 90 degrees relative to the longitudinal axis y. As will be apparent, any other angle may be selected. Further, in FIG. 4, the longitudinally-oriented surface 44 of the second bracket 40 is retracted in the longitudinal direction y towards the vertically-oriented surface 32 of the first bracket 30, such that the elongate member 47 is also disposed at the far end of the slot 35 at a location in relatively close proximity to the mounting surface 39. It is noted that a user may adjust the lighting assembly 70 to any desired position, such as those shown in FIGS. 1-4, during installation of the system. However, it is within the scope of the present embodiments to include a handle or other external adjustment mechanism, coupled to at least a portion of the second bracket 40 and/or elongate member 47, to allow remote repositioning of the second bracket 40 relative to the first bracket 30.

Advantageously, the adjustable bracket assembly 20 allows the lighting assembly 70 to be positioned with a significantly greater degree of freedom than is possible with a fixed bracket design. Moreover, a fixed bracket design may preclude installation of a larger lamp that could enhance efficacy of treatment. As a further advantage, in the event that the magnet 38 is employed, installation difficultly may be reduced by alleviating the need to create holes through the mounting surface 39 and use associated mechanical fasteners.

Furthermore, the air space within which the lighting assembly 70 is intended to be mounted may be restricted in terms of available space, and it is desirable to maximize the UV exposure of certain areas and components within the space with UV radiation, while it is also undesirable to illuminate other components that may be susceptible to damage by UV radiation. The adjustable bracket assembly 20 provides a system that resolves many of these concerns by allowing optimal, adjustable positioning of the lighting assembly in a desired longitudinal and radial position that can address various space nuances or other issues.

When the lighting assembly 70 comprises one or more UV lamps, the additional degrees of freedom allow the lighting assembly 70 to be mounted in positions that are more optimal for efficacy of the germicidal effect of UV rays, acting both upon the air stream to be treated and components of the air handling equipment for which treatment is desired.

It is noted that providing an adjustable bracket assembly 20 with increased degrees of freedom may increase the bending moment and other forces on the attachment structure. Therefore, if a magnet 38 is used, it should have a sufficiently high pull-off force so that it cannot be inadvertently disengaged from the mounting surface 39.

In an alternative embodiment, the second bracket 40 may be disengaged from the first bracket 30 and repositioned in an inverted position with respect to the first bracket 30. For example, while the second bracket 40 is shown in FIGS. 1-4 as being placed above the first bracket 30, the second bracket 40 may instead be placed below the first bracket 30 to thereby change the orientation of the lighting assembly 70 within the air space.

In a further alternative, the second bracket 40 may be disengaged from the first bracket 30, optionally altered in orientation, and used to mount the lighting assembly 70 directly to a surface. In this manner, the second bracket 40 and the lighting assembly 70 can therefore alternatively be used without the first bracket 30 as desired in a stand-alone manner.

In alternative embodiments, any of the components shown in FIGS. 1-4 may be fitted with a reflective shield to prevent irradiation of sensitive components within the air handling equipment. Additionally, such a shield may be selectively placed to intensify or alter irradiation at any particular location.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A system for adjusting a position of at least one ultraviolet lamp, the system comprising:
   a first bracket; and
   a second bracket, where the second bracket is coupled to at least one ultraviolet lamp,
   wherein the at least one ultraviolet lamp is disposed within an air treatment space,
   wherein the first and second brackets are movable relative to each other to place the at least one ultraviolet lamp in a first position to treat air flowing in a first area of the air treatment space, and the first and second brackets are movable relative to each other to place the at least one ultraviolet lamp in a second position to treat air flowing in a second area of the air treatment space, wherein the second area is different than the first area, and
   wherein the second bracket is positioned at least partially within the air treatment space.

2. The system of claim 1, wherein the first bracket is fixed in place.

3. The system of claim 1, wherein the second bracket is movable in both longitudinal and radial directions relative to the first bracket.

4. The system of claim 1, wherein the first bracket comprises a vertically-oriented surface and a longitudinally-oriented surface.

5. The system of claim 4, wherein the second bracket comprises a vertically-oriented surface and a longitudinally-oriented surface, wherein the longitudinally-oriented surface of the first bracket abuts the longitudinally-oriented surface of the second bracket.

6. The system of claim 5 further comprising:
   at least one slot formed in the longitudinally-oriented surface of the first bracket; and
   at least one elongate member coupled to the second bracket and disposed through the at least slot formed in the first bracket.

7. The system of claim 6 further comprising a bore formed in the longitudinally-oriented surface of the second bracket, wherein the bore is aligned with the at least one slot of the first bracket, and wherein the at least one elongate member is disposed through the bore.

8. The system of claim 4 further comprising a magnet coupled the vertically-oriented surface of the first bracket.

9. The system of claim 8, wherein the magnet is coupled the vertically-oriented surface of the first bracket in a direction facing away from the second bracket.

10. A method for adjusting a position of at least one ultraviolet lamp, the method comprising:
    providing a first bracket and a second bracket;
    coupling at least one ultraviolet lamp to the second bracket, wherein the at least one ultraviolet lamp is disposed within an air treatment space; and
    moving the first and second brackets relative to each other to place the at least one ultraviolet lamp in a first position to treat air flowing in a first area of the air treatment space, and moving the first and second brackets relative to each other to place the at least one ultraviolet lamp in a second position to treat air flowing in a second area of the air treatment space, wherein the second area is different than the first area, and wherein the second bracket is positioned at least partially within the air treatment space.

11. The method of claim 10, wherein the first bracket is fixed in place.

12. The method of claim 10, wherein the second bracket is movable in both longitudinal and radial directions relative to the first bracket.

13. The method of claim 10, wherein the first bracket comprises a vertically-oriented surface and a longitudinally-oriented surface.

14. The method of claim 13, wherein the second bracket comprises a vertically-oriented surface and a longitudinally-oriented surface, wherein the longitudinally-oriented surface of the first bracket abuts the longitudinally-oriented surface of the second bracket.

15. The method of claim 14 further comprising:
providing at least one slot formed in the longitudinally-oriented surface of the first bracket; and
providing at least one elongate member coupled to the second bracket and disposed through the at least slot formed in the first bracket.

16. The method of claim 15 further comprising providing a bore formed in the longitudinally-oriented surface of the second bracket, wherein the bore is aligned with the at least one slot of the first bracket, and wherein the at least one elongate member is disposed through the bore.

17. The method of claim 13 further comprising coupling a magnet to the vertically-oriented surface of the first bracket.

18. A system for adjusting a position of at least one ultraviolet lamp, the system comprising:
a first bracket that is fixed in place; and
a second bracket, where the second bracket is coupled to at least one ultraviolet lamp,
wherein the at least one ultraviolet lamp is disposed within an air treatment space,
wherein the first and second brackets are movable relative to each other to place the at least one ultraviolet lamp in a first position to treat air flowing in a first area of the air treatment space, and the first and second brackets are movable relative to each other to place the at least one ultraviolet lamp in a second position to treat air flowing in a second area of the air treatment space, wherein the second area is different than the first area, and
wherein the second bracket is movable in both longitudinal and radial directions relative to the first bracket, and
wherein the second bracket has a state in which it is disposed further inward relative to the air treatment space than the first bracket.

19. The system of claim 18, wherein the first bracket comprises a vertically-oriented surface and a longitudinally-oriented surface,
wherein the second bracket comprises a vertically-oriented surface and a longitudinally-oriented surface, and
wherein the longitudinally-oriented surface of the first bracket abuts the longitudinally-oriented surface of the second bracket.

20. The system of claim 19 further comprising:
at least one slot formed in the longitudinally-oriented surface of the first bracket;
at least one elongate member coupled to the second bracket and disposed through the at least slot formed in the first bracket; and
a bore formed in the longitudinally-oriented surface of the second bracket, wherein the bore is aligned with the at least one slot of the first bracket, and wherein the at least one elongate member is disposed through the bore.

* * * * *